United States Patent [19]

Bobsein et al.

[11] Patent Number: 5,075,420

[45] Date of Patent: Dec. 24, 1991

[54] MELT STABLE PHENYLENE SULFIDE/SULFONE POLYMERS AND METHOD

[75] Inventors: Rex L. Bobsein, Bartlesville, Okla.; Robert W. Campbell, Akron, Ohio; Harold D. Yelton; Michael C. Yu, both of Bartlesville, Okla.

[73] Assignee: Phillips Petroleum Company, Bartlesville, Okla.

[21] Appl. No.: 640,092

[22] Filed: Jan. 11, 1991

Related U.S. Application Data

[62] Division of Ser. No. 502,812, Apr. 20, 1990.

[51] Int. Cl.$^5$ ............................................. C08G 75/14
[52] U.S. Cl. .................................. 528/388; 528/492; 528/495; 528/496
[58] Field of Search ................. 528/388, 492, 495, 496

[56] References Cited

U.S. PATENT DOCUMENTS

| | | | |
|---|---|---|---|
| 3,354,129 | 11/1967 | Edmonds et al. | 260/79 |
| 3,919,177 | 11/1975 | Campbell | 260/79.1 |
| 3,953,401 | 4/1976 | Gabler et al. | 260/49 |
| 4,089,847 | 5/1978 | Edmonds, Jr. et al. | 260/79.1 |
| 4,125,525 | 11/1978 | Campbell | 528/388 |
| 4,127,713 | 11/1978 | Campbell | 528/391 |
| 4,299,951 | 11/1981 | Campbell | 528/491 |

*Primary Examiner*—Morton Foelak
*Attorney, Agent, or Firm*—Laney, Dougherty, Hessin & Beavers

[57] ABSTRACT

A phenylene sulfide/sulfone polymer with relatively good melt stability and a method of producing such a polymer are provided. A previously produced phenylene sulfide/sulfone polymer is redissolved in N-methyl-2-pyrrolidone to form a solution. This solution is combined with an alcohol to precipitate highly melt stable phenylene sulfide/sulfone polymer in a particulate form. The alcohol has one to four carbon atoms, such as methanol, ethanol, 1-propanol, 2-propanol, 1-butanol, 2-butanol, and the like and mixtures thereof.

10 Claims, No Drawings

MELT STABLE PHENYLENE SULFIDE/SULFONE POLYMERS AND METHOD

This is a of copending application(s) Ser. No. 07/502,812 filed on Apr. 2, 1990.

BACKGROUND OF THE INVENTION

1. Field of the Invention

This invention relates to melt stable phenylene sulfide/sulfone polymers (PPSS) and methods of preparing such PPSS, and more particularly, to the production of PPSS with good melt stability by reprecipitation of the polymer from solution in N-methylpyrrolidone by combining with an alcohol.

2. Description of the Prior Art

In recent years, a wide variety of high polymers have been prepared, many of which are currently being produced and marketed on a large scale. such polymers of the thermoplastic type can be molded rapidly and efficiently into almost any desired shape, thus lending themselves to mass production.

Arylene sulfide/sulfone polymers are engineering thermoplastics of commercial interest for film, fiber, molding and composite applications because of their high melting points and heat resistance. General processes for the production of arylene sulfide/sulfone polymers are known. However, a major disadvantage has been that the arylene sulfide/sulfone polymers have relatively poor melt stabilities and are not very processable.

One group of arylene sulfide/sufone polymers is phenylene sulfide/sulfone polymers. Phenylene sulfide/sulfone polymers, or poly(phenylene sulfide/sulfones) (PPSS), typically have relatively low melt stabilities which make them more difficult to mold and form into various shapes. It is therefore desirable to produce phenylene sulfide/sulfone polymers which have relatively good melt stabilities to facilitate molding. Melt stable phenylene sulfide/sulfone polymers would provide improved processability, color, texture, flexibility and toughness. In addition, melt stable poly(phenylene sulfide/sulfone) should be able to be slowly cured, to increase the molecular weight.

Thus, it will be seen that there is a need for a process for producing phenylene sulfide/sulfone polymers with good melt stabilities.

SUMMARY OF THE INVENTION

The present invention meets the need recited above by providing a method of treating phenylene sulfide/sulfone polymer to improve the melt stability thereof. The method comprises the steps of dissolving phenylene sulfide/sulfone polymer in N-methyl-2-pyrrolidone solvent to form a solution and combining an alcohol with the solution to reprecipitate phenylene sulfide/sulfone polymer in a particulate form. The alcohol is one of the group consisting of alcohols having one to four carbon atoms such as methanol, ethanol, 1-propanol, 2-propanol, 1-butanol, 2-butanol, and the like and mixtures thereof. The presently preferred alcohol is methanol.

The reprecipitated PPSS solid can be separated from the N-methyl-2-pyrrolidone-methanol liquid by a filtration step using filters, such as drum filters, belt filters, or the like, or by using centrifuges or other devices as is known to those skilled in the art.

In a preferred embodiment, the polymer is dissolved in the solvent with stirring at a temperature in the range of from about 150° C. to about 200° C., reprecipitated, filtered or separated from the liquid and then washed in warm methanol.

The present invention also provides a method of producing melt-stable phenylene sulfide/sulfone polymer in a powdered form comprising the steps of contacting in a polar organic solvent a polyhaloaromatic sulfone monomer and an alkali metal sulfide under polymerization conditions effective for producing a phenylene sulfide/sulfone polymer, recovering the polymer, redissolving the polymer in a N-methyl-2-pyrrolidone solvent to form a solution, and reprecipitating the polymer by adding an alcohol to the solution while stirring the solution.

The present invention may also be said to relate to a powdered phenylene sulfide/sulfone polymer formed by redissolving phenylene sulfide/sulfone polymer in N-methyl-2-pyrrolidone to form a solution, and combining the solution with an alcohol while stirring to precipitate melt-stable phenylene sulfide/sulfone polymer.

It is an important object of the present invention to provide a process for producing phenylene sulfide/sulfone polymers with relatively good melt stabilities.

It is another object of the invention to provide a process for precipitating PPSS in a powdered form from a solution of N-methyl-2-pyrrolidone with phenylene sulfide/sulfone polymer redissolved therein by combining the solution with an alcohol.

It is a further object of the invention to provide a relatively highly melt-stable PPSS compound formed by combining an alcohol with a solution of phenylene sulfide/sulfone polymer in N-methyl-2-pyrrolidone.

Additional objects and advantages of the invention will become apparent from the following detailed description of the preferred embodiment.

DESCRIPTION OF THE PREFERRED EMBODIMENT

The present invention relates to a relatively highly melt-stable phenylene sulfide/sulfone polymers and a method of making such a polymers.

Initially, the phenylene sulfide/sulfone polymer is produced by polymerization of aromatic compounds. This production of PPSS polymer may be carried out in any manner known in the art such as the production methods disclosed in U.S. Pat. Nos. 4,125,525 and 4,127,713 to Campbell, both assigned to the assignee of the present invention which are incorporated herein by reference. Generally, the polymer is prepared by contacting in a polar organic solvent a polyhaloaromatic sulfone monomer and an alkali metal sulfide under polymerization conditions effective for producing a polymer, after which the polymer is recovered. For example, the polymer may be produced by forming a solution of at least one dihalo aromatic sulfone, at least one alkali metal sulfide other than lithium sulfide, at least one organic amide such as N-methyl-2-pyrrolidone, at least one sodium carboxylate, and water, and contacting this solution under polymerization conditions for a period of time sufficient to form an organic sulfide/sulfone polymer. It is also known to recover the polymer by precipitating it from the reaction solution with methanol. Previously known PPSS compounds formed in such a manner produce materials with relatively poor melt stabilities.

In the present invention, the previously produced solid phenylene sulfide/sulfone polymer, which may be made in any suitable manner, including by the above described method, is redissolved in a solvent such as N-methyl-2-pyrrolidone to form a solution. An alcohol having one to four carbon atoms, such as methanol, ethanol, 1-propanol, 2-propanol, 1-butanol, 2-butanol, and mixtures thereof, is combined with the solution in a sufficient amount to reprecipitate the PPSS in particulate or powder form. To maximize surface area, the precipitation is carried out while stirring the solution.

The reprecipitated phenylene sulfide/sulfone polymer has a relatively good melt stability which is better than that shown for PPSS subjected to previously known water extraction methods, such as described in Example 2.

The following examples are presented to further illustrate the polymer and methods of the invention. The particular species and conditions employed in the examples are intended to be illustrative of the invention and not limiting thereto.

Example 1

A control sample of poly(phenylene sulfide/sulfone), hereinafter referred to as resin A, was tested for melt stability. The melt flow rate shown and discussed herein is an indicator of melt stability and is a property of the material generally expressed in grams per 10 minutes (g/10 min). All of the melt flow testing described herein was run using ASTM method D 1238, condition 343/5.0, modified to a five-minute preheat period.

Under ASTM method D 1238, condition 343/5.0, a quantity of dried polymer is heated in a cylinder at approximately 343° C. A weight is positioned on top of the polymer. The polymer is held at this temperature for five minutes and then a plug is removed from an orifice at the bottom of the cylinder. The weight forces the polymer through the orifice in the cylinder as a viscous strand. At one minute after the plug is removed, the strand is cut with a spatula or similar device. The sample is weighed, and the melt flow rate is calculated. Subsequent cuts are made at one-minute intervals.

Table I summarizes the melt flow test results for Resin A:

TABLE I

| | RESIN A | |
|---|---|---|
| Time in Minutes at 343° C. | Weight of Sample, Grams | Melt Flow Rate, Grams Per 10 Min. |
| 6 | 0.51 | 5.1 |
| 7 | 0.44 | 4.4 |
| 8 | 0.42 | 4.2 |
| 9 | 0.42 | 4.2 |
| 10 | 0.40 | 4.0 |
| 11 | 0.40 | 4.0 |
| 12 | 0.38 | 3.8 |
| 13 | 0.38 | 3.8 |
| 14 | 0.35 | 3.5 |
| 16 | 0.31 | 3.1 |

It will be seen from Table I that the melt flow rate degrades rapidly over time. From 6 minutes to 11 minutes, the melt flow rate decreases from 5.1 g/10 min to 4.0 g/10 min which is approximately 78% of its original value.

Example 2

A solution was formed by mixing 40 grams of poly(phenylene sulfide/sulfone) (Resin A) and 300 grams of N-methyl-2-pyrrolidone in a 500 milliliter Erlenmeyer flask. Using nitrogen flow, the solution was stirred and heated to 165° C. on a hot plate. The polymer was soluble at this temperature.

The solution was combined with hot water in a Waring blender while stirring. Phenylene sulfide/sulfone polymer was precipitated from the solution. This precipitated polymer, referred to as Resin B, was filtered in a vacuum funnel to remove the liquid, and the product was washed and dried.

Table II shows the melt flow data that was obtained:

TABLE II

| | RESIN B | |
|---|---|---|
| Time in Minutes at 343° C. | Weight of Sample, Grams | Melt Flow Rate, Grams Per 10 Min. |
| 6 | 0.88 | 8.8 |
| 7 | 0.81 | 8.1 |
| 8 | 0.78 | 7.8 |
| 9 | 0.75 | 7.5 |
| 10 | 0.68 | 6.8 |
| 11 | 0.66 | 6.6 |
| 12 | 0.60 | 6.0 |

As seen in Table II, the melt flow rate is higher for Resin B than Resin A. However, the melt flow rate decreased between 6 minutes and 11 minutes from 8.8 g/10 min to 6.6 g/10 min which is only 75% of the original value. Thus, while the melt flow rate is increased, the retention of the initial melt flow rate is not an improvement over Resin A.

Example 3

A mixture containing 40 grams of poly(phenylene sulfide/sulfone) (Resin A) and 300 grams of N-methyl-2-pyrrolidone was formed. This mixture was stirred and heated on a hot plate in an Erlenmeyer flask with nitrogen flow to 160° C. The polymer was soluble at this temperature, and the solution formed was amber in color.

The solution was combined with methanol in a Waring blender while stirring. A fluffy, white product was precipitated which was filtered in a vacuum funnel to remove the liquid. The product was washed in warm methanol five times, then dried overnight at 180° C. The resulting product is referred to as Resin C.

The following Table III shows data for Resin C:

TABLE III

| | RESIN C | |
|---|---|---|
| Time in Minutes at 343° C. | Weight of Sample, Grams | Melt Flow Rate, Grams Per 10 Min. |
| 6 | 0.99 | 9.9 |
| 7 | 0.95 | 9.5 |
| 8 | 0.92 | 9.2 |
| 9 | 0.90 | 9.0 |
| 10 | 0.91 | 9.1 |
| 11 | 0.91 | 9.1 |

Table III shows that the melt flow rate for Resin C is increased over that for Resin B shown in Table II and greatly increased over that shown for Resin A in Table I. Further, the melt flow rate from 6 minutes to 11 minutes only dropped from 9.9 g/10 min to 9.1 g/10 min which is approximately 92% of the initial melt flow rate. Thus, the retention of the initial melt flow rate over time is greatly increased over both Resins A and B.

Example 4

In another experiment, Resin C, which was produced in Example 3 above, was compression molded at 316° C., chopped and dried sixteen hours at 165° C. Table IV shows the melt flow data obtained:

TABLE IV

| RESIN C - COMPRESSION MOLDED | | |
|---|---|---|
| Time in Minutes at 343° C. | Weight of Sample, Grams | Melt Flow Rate, Grams Per 10 Min. |
| 6 | 0.89 | 8.9 |
| 7 | 0.92 | 9.2 |
| 8 | 0.88 | 8.8 |
| 9 | 0.89 | 8.9 |
| 10 | 0.87 | 8.7 |
| 11 | 0.86 | 8.6 |
| 12 | 0.87 | 8.7 |

Table IV shows that Resin C, after being compression molded, has a melt flow rate which drops over the time from 6 minutes to 11 minutes from 8.9 g/10 min to 8.6 g/10 min which is over 95% of the initial melt flow rate. Again, Table IV shows that Resin C has a greatly improved melt stability over Resins A or B.

In summary, it will be seen that when phenylene sulfide/sulfone polymer is reprecipitated from a solution containing N-methyl-2-pyrrolidone combined with methanol, as for Resin C, the retention over time of the initial melt flow rate of the polymer at 6 minutes is much greater. Thus, Resin C has a considerably better melt stability than the polymer using a water extraction method (Resin B) and the control polymer (Resin A).

Thus, the polymer and method of the present invention are well adapted to carry out the ends and advantages mentioned as well as those inherent therein. Numerous changes and modifications may be made by those skilled in the art. All such changes are encompassed within the scope and spirit of the appended claims.

What is claimed is:

1. A highly melt stable phenylene sulfide/sulfone polymer compound formed by:
   redissolving phenylene suflide/sulfone polymer in N-methyl-2-pyrrolidone to form a solution; and
   combining said solution with an alcohol having one to four carbon atoms to precipitate the polymer compound.

2. The compound of claim 1 wherein said alcohol is selected from the group consisting of methanol, ethanol, 1-propanol, 2-propanol, 1-butanol, and mixtures thereof.

3. The compound of claim 2 wherein the alcohol selected is methanol.

4. The compound of claim 1 wherein said solution and said alcohol are stirred while combining.

5. The compound of claim 1 further comprising filtering the polymer compound after precipitation thereof.

6. The compound of claim 5 further comprising washing the polymer compound with methanol after filtering thereof.

7. The compound of claim 6 further comprising drying the polymer compound after washing thereof.

8. The compound of claim 15 further comprising heating said solution during said redissolving to a temperature in the range of approximately 150° C. to approximately 200° C.

9. The compound of claim 15 wherein a melt flow rate of the compound after about 5 minutes is greater than about 90% of an initial melt flow rate, said melt flow rates being determined by ASTM Method D 1238, condition 343/5.0, modified to a five-minute preheat period.

10. The compound of claim 23 wherein said melt flow rate after 5 minutes is approximately 92% of said initial melt flow rate.

* * * * *

UNITED STATES PATENT AND TRADEMARK OFFICE
CERTIFICATE OF CORRECTION

PATENT NO. : 5,075,420
DATED : December 24, 1991
INVENTOR(S) : Rex L. Bobsein, et al.

It is certified that error appears in the above-identified patent and that said Letters Patent is hereby corrected as shown below:

Column 1, line 5, after "a" and before "of", insert --divisional--.

Column 1, line 19, delete "such" and insert --Such-- therefor.

Column 1, line 32, delete "sufone" and insert --sulfone-- therefor.

Column 2, line 47, delete "polymer".

Column 6, line 6, delete "suflide" and insert --sulfide-- therefor.

Column 6, line 13, after "1-butanol", insert --2-butanol--.

Col.6, Claims 8 and 9 should be dependent from claim 1.

Col.6, Claim 10 should be dependent from claim 9.

Signed and Sealed this

Twentieth Day of April, 1993

Attest:

MICHAEL K. KIRK

Attesting Officer

Acting Commissioner of Patents and Trademarks